United States Statutory Invention Registration [19]

[11] Reg. Number: H467

Gladden [43] Published: May 3, 1988

[54] ARTPRINTOGRAPHY KIT

[76] Inventor: Bruce W. Gladden, 6322 Dogwood Dr., Orlando, Fla. 32807

[21] Appl. No.: 99,329

[22] Filed: Sep. 21, 1987

[51] Int. Cl.[4] ..... B65D 69/00

[52] U.S. Cl. ..... 206/234; 206/575

*Primary Examiner*—Deborah L. Kyle
*Assistant Examiner*—Michael J. Carone
*Attorney, Agent, or Firm*—Norman E. Reitz

[57] ABSTRACT

An artprintography kit includes a collection of tools and materials within a convenient container for the purpose of readily preparing, storing and displaying artprintographs or artpictographs.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

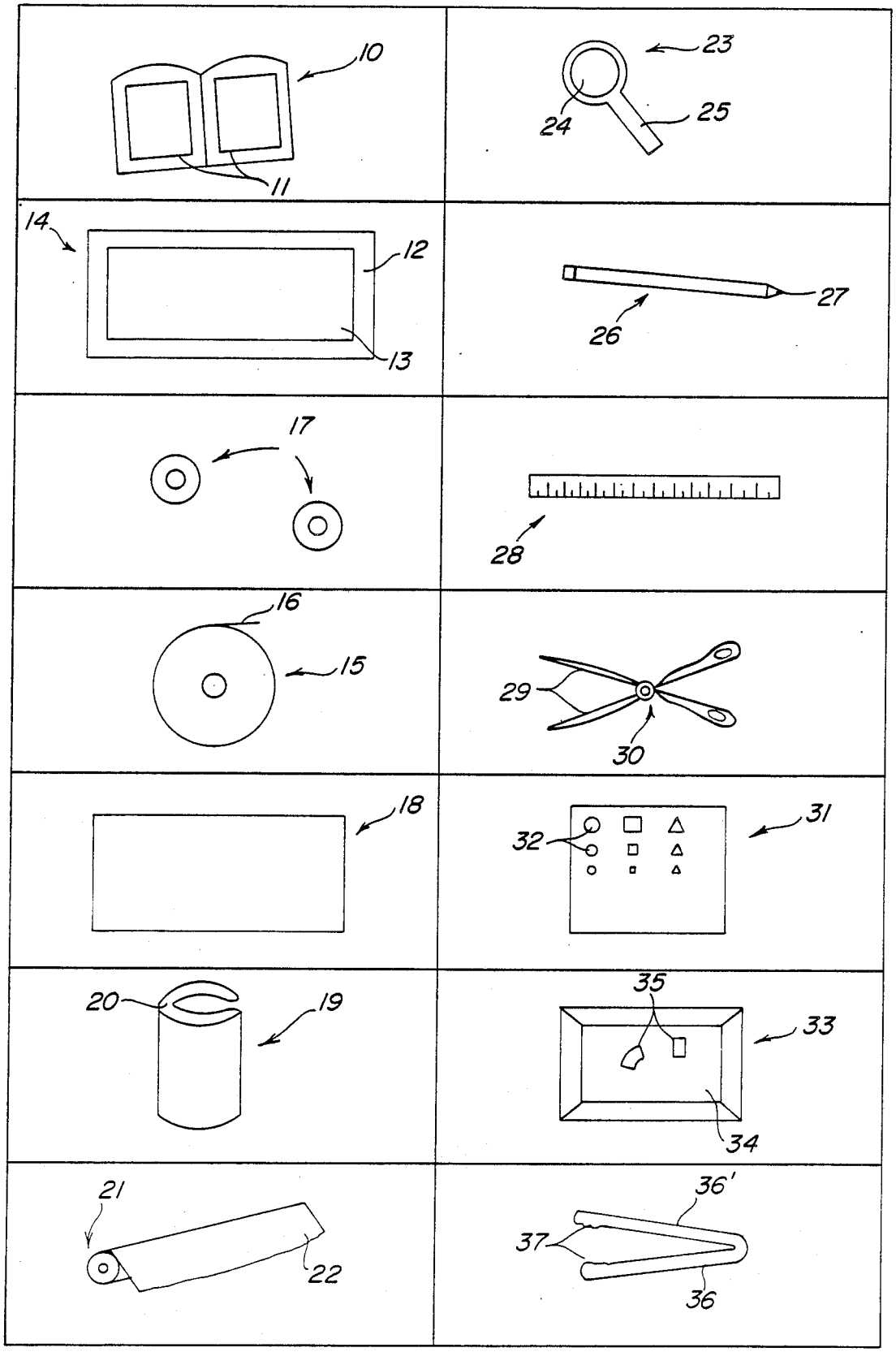
10
11
23
24
25
14
12
13
27
26
17
28
16
15
29
30
18
31
32
20
19
35
33
34
21
22
36'
37
36

ARTPRINTOGRAPHY KIT

This invention relates to a kit for assembling art materials in an art album. More particularly, it relates to a kit for cutting art prints out of newspapers or from any metal, cloth, paper or plastic printed source. And still more particularly, it is for assembling, arranging and storing a collection of two dimensional art works.

Hobbyists, amateur historians, geographers, students and art collectors have engaged in the pastime of searching for two dimensional art works such as postage stamps, stock certificates, paintings, photos, posters, signs for advertising and any other printed impressions on utilitarian objects. These art works have been utilized for various purposes. In the beginning this practice was not well known but it is now becoming known and organized. The utility of a collection of two dimensional art works will be enhanced in direct proportion to the degree of organization, particularly if the collection comprises art works of many different colors and shapes from many different countries around the world. In principal, it would be possible to organize the art works in many different ways such as by type style or in alphabetical order. The care with which each work of art is prepared will also enhance the desirability of the assembled collection. Finally, the classification scheme for the art work will enhance the educational value of the collection.

It is therefore an object of the present invention to provide a kit which contains the tools, materials and an art album for carefully preparing and displaying two dimensional artwork, the means for assembling, classifying and storing a large amount of art work, means for cutting the art work from cloth, metal, paper, plastic and means for classifying and storing the art work which has been derived from all countries of the world.

BRIEF DESCRIPTION OF THE DRAWINGS

For a more complete understanding of the kit of the present invention reference may be had to the accompanying Drawing which is incorporated herein by reference and which is a plan view of the kit illustrating the various storage bins for holding and storing tools and materials.

SUMMARY OF THE INVENTION

The artprintography kit of the present invention comprises a container or sack for holding the materials and tools needed for preparing artprintographs or artpictographs and includes the materials and tools.

DESCRIPTION OF THE PREFERRED EMBODIMENTS

Artprintography is a made-up word which means the study of collecting, organizing or classifying two dimensional art prints from various locations around the world. It is analagous to the pastimes of philately [the collection and study of postage stamps] and nusimatics [the collection and study of coins]. It involves the study of art, foreign language and number codes from all around the world. A person who pursues artprintography, also known as artprintagraphics, has a wide variety of sources from which to find suitable works of art for collection and study. The hobby may involve classification by color, shape, alphabetical designation, country of origin, type of paper or various other distinguishing characteristics. Table 1 on the following page contains a representative list of sources.

TABLE 1

1. Bags
2. Black light prints
3. Books
4. Bottles
5. Boxes
6. Calendars
7. Cans
8. Cards
9. Cartons
10. Catalogs
11. Checks
12. Comic prints
13. Containers
14. Coupons
15. Cups
16. Decals
17. Drawings
18. Envelopes
19. Holographs
20. Labels
21. Letters
22. Jars
23. Magazines
24. Matchbooks
25. Metal Prints
26. Moving Van Tape
27. Newspapers
28. Order Forms
29. Packages
30. Painted Matter
31. Phamplets
32. Paper money from foreign countries
33. Photographs
34. Posters
35. Price tags
36. Printed Papers
37. Receipts
38. Record Album Cases
39. Stamps
40. Stickers
41. Straw Packages
42. Stocks and Bonds
43. Tickets
44. Transgraphic cloth
45. Wrappers
46. Xographs When engaging in the pastime of artpringography you will organize your art work by general categories such as design, objects or codes, etc. Objects, for example, include things as atoms, boats, bottles, buildings, food, guns, clothing, dishes, hats, planets, stars, vehicles, windows, etc. Designs can incorporate subjects such as nature, astromony, etc.

In any art print there are five main features: (1) the highlight; (2) the background; (3) the foreground; (4) the foreline; and (5) the forspace. In practice, although there are many sources as shown in Table 1, some 95% to 97% or all art works come from books, catalogs, magazines and newspapers. The pastime is for all individuals of all ages.

The tools shown in the Drawing may be obtained from items already found in the average home. Or they may be purchased in hardware of dime stores. For example, in a household in which there resides a student one will find the following usable items: (1) colored chalk; (2) colored crayons; (3) colored magic markers; (4) color paints; (5) colored pencils; (6) color pens; (7) color stamp pads.

Methods for use in art print preparation are disclosed in outside references. Here, briefly, it can be stated that initially, the art prints can be examined by use of the magnifying glass 23 having the magnifying means 24 and handle 25. You can then cut the art prints, after measuring with the ruler 28 and sizing with the template 32, with a pair of scissors 30 having cutting edges 29 and paste them in an art album 10 having separate pages 11; the holes punched in the pages can be reinforced by the gummed circular reinforcement means 17. The works of art 35 or the album 10 may be identified by the labels 14 having the borders 12 and display space 13. The identification can be made by the pencil 26. You should always leave a forespace or at least a foreline around the work. The foreline is a line around all the sides of the work of art. The forespace is a white area along the ends of the work of art. It is always best to have an even amount of forespace around the work of art. The art works 35 can be displayed temporarily in the bottom 34 of the tray 33, and handled as necessary by the tweezers 36, 36' having the tips 37. If desired, the art work can be covered with a plastic laminate 18 for protection. Then steel tape 19 can be applied to the reverse side. And finally a double faced tape 16 taken from a roll 15 can be placed on the back of the stainless steel tape. Then the art print may be stuck onto an album page 11. The wax paper 22 can be taken from the roll 21 and used to prevent art works on opposing pages from coming into contact with each other.

I claim:

1. An artprintography kit comprising a container having separate compartments, a collection of tools placed respectively in the various compartments and a collection of materials placed respectively in others of the various compartments.

* * * * *